Feb. 12, 1963   A. CELLI   3,077,367
BEARING STRUCTURE
Filed Sept. 22, 1961   2 Sheets-Sheet 1

INVENTOR.
ALDO CELLI
BY
WILSON, SETTLE & CRAIG
ATTORNEYS

Feb. 12, 1963 A. CELLI 3,077,367
BEARING STRUCTURE
Filed Sept. 22, 1961 2 Sheets-Sheet 2

INVENTOR.
ALDO CELLI
BY
WILSON, SETTLE & CRAIG
ATTORNEYS

United States Patent Office 3,077,367
Patented Feb. 12, 1963

3,077,367
BEARING STRUCTURE
Aldo Celli, Detroit, Mich., assignor to Detroit Aluminum
& Brass Corporation, Detroit, Mich., a corporation of
Michigan
Filed Sept. 22, 1961, Ser. No. 139,989
7 Claims. (Cl. 308—122)

This invention relates to a bearing structure, and more particularly to a sleeve bearing for gas turbine engines.

Considerable development effort has, in recent years, been directed towards the design of an efficient gas turbine engine for both aircraft and automotive use. Among the many problems encountered in this development work has been the provision of a bearing for the main shaft of the turbine. The bearing must have reliable performance and be durable in environmental temperatures ranging from 1500° F. to 1900° F. and at shaft speeds of up to 60,000 r.p.m. with accelerations of the order of from zero to 10,000 r.p.m. in one second. As will be appreciated, these requirements have made it difficult to design a suitable bearing.

Lubrication and heat insulation of the bearing interface under these conditions present the primary problems. The lubricating oil must be maintained at a proper temperature, oil cavitation must be avoided, and the oil film must be prevented from breaking. The bearing interface must be prevented from becoming hot as this would cause excessive wear. The present invention offers a solution to these problems by providing a bearing which will operate under the conditions above mentioned with proper lubrication and which will also protect the bearing surfaces from the heat generated in a gas turbine engine.

It is, therefore, an object of the invention to provide a bearing structure for a gas turbine engine.

A further object of the invention is to provide a sleeve bearing in which a porous sleeve is provided to serve as a conduit for lubricating oil to result in a constant flow of oil to the bearing interface.

Another object of the invention is to provide a porous sleeve for the transmission of lubricating oil which will evenly distribute the desired film of lubricating oil over the entire bearing surfaces.

A still further object of the invention is to provide a porous sleeve encircling the shaft, and in which the pockets in the porous sleeve act as insulation to prevent the transmission of heat from the shaft to the bearing surfaces.

Another object of the invention is to provide a bearing configuration in which the bearing surfaces are effectively shielded from heat generated externally of the bearing structure.

A still further object of the invention is to provide a labyrinth seal forming a portion of the porous sleeve to prevent the leakage of lubricating oil from the bearing.

Other objects of this invention will appear in the following description and appended claims, reference being had to the accompanying drawings forming a part of this specification wherein like reference characters designate corresponding parts in the several views.

Figure 1:
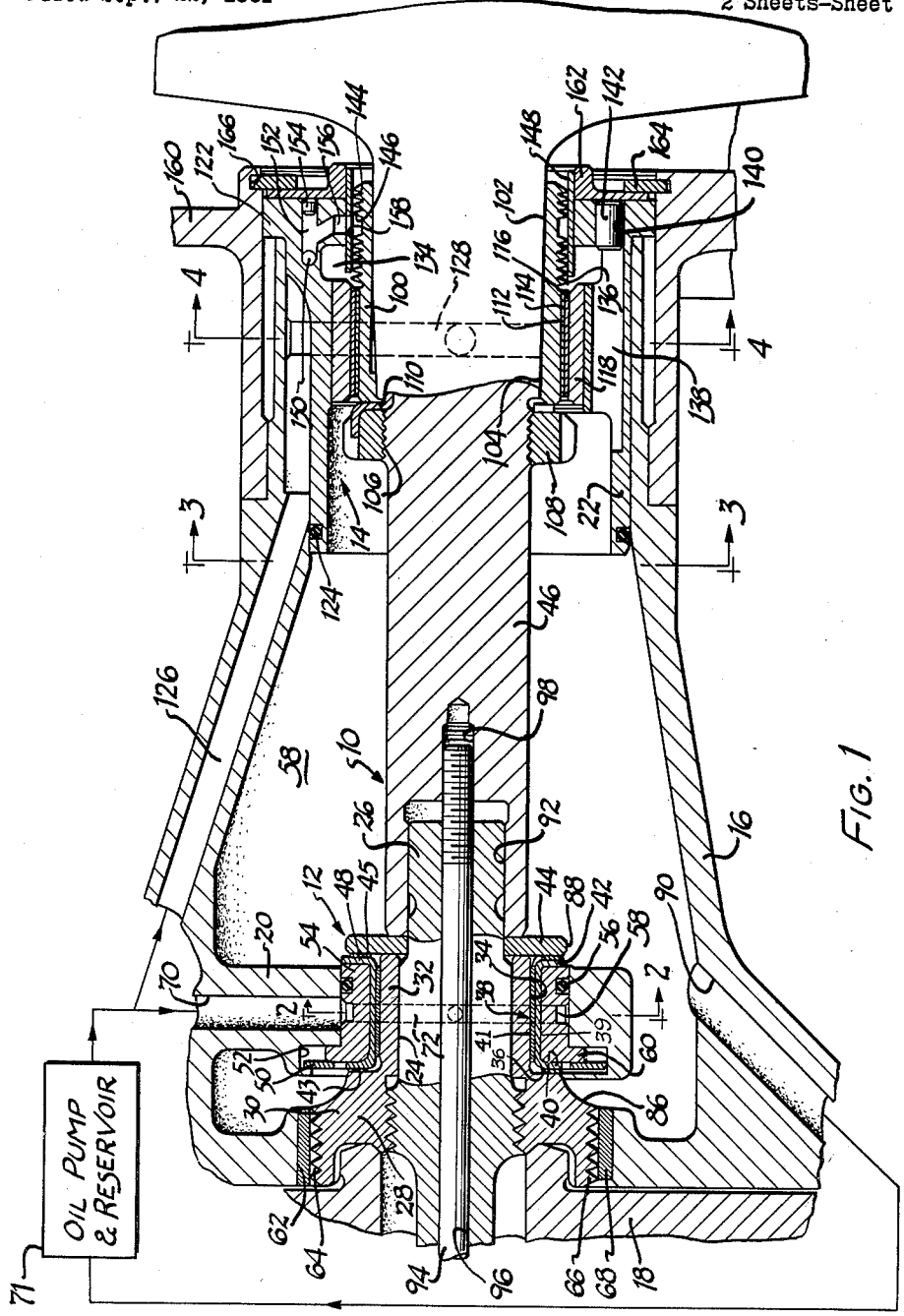
FIGURE 1 is a side elevational view in section of one embodiment of the bearing structure of the present invention.
Figure 3:
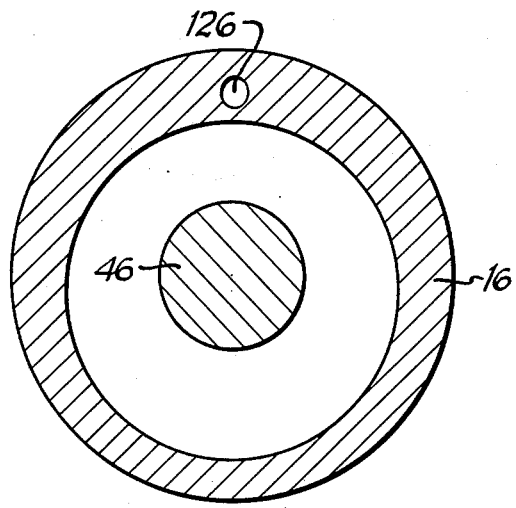
FIGURE 3 is a cross sectional view taken substantially along the line 3—3 of FIGURE 1 looking in the direction of the arrows and showing the interior configuration of the bearing housing.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The bearing structure illustrated in the drawings is shown in the environment of a gas turbine engine, for which the bearing structure is particularly adapted. However, it will be appreciated that the bearing structure may be used in any application having problems similar to those involved in journalling a shaft in a gas turbine engine.

Referring to FIGURE 1, a shaft 10 is journalled in a pair of bearing structures 12, 14, which are mounted within a housing structure 16. In the embodiment shown, the housing 16 is mounted within the casing of a gas turbine engine, the structures 18 and 160 representing supports in the engine casing for the housing 16. A fixed support 20 and a removable support 22 are provided within the housing 16 to carry the bearing structures. The bearing structures, although differently configured, are essentially the same in principal.

Considering first the bearing 12, it will be noted that a sleeve 24 is fixedly secured to shaft segment 26 by means of the threaded portion 28. The sleeve 24 forms an important part of the invention. It is fabricated from a porous metal, preferably sintered steel. Sintered steel is a metal in which small particles of steel are welded together, leaving interconnected pockets throughout the entire mass. The sleeve 24 includes an enlarged portion 30, and a portion 32 of reduced diameter. The exterior peripheral surface 34 and the shoulder surface 36 are machined to a bearing finish and in operation slide on a metal sleeve bearing 38 which is fixedly secured within the support 20. The sleeve bearing 38 includes a support member 48 having a channel-shaped cross section with upwardly extending flanges 40, 42. A bearing lining 41 is affixed to the interior periphery of member 39 and bearing rings 43, 45 are affixed to flanges 40, 42. The ring 43 is in bearing contact with the shoulder surface 36 and the ring 45 is in bearing contact with a sintered metal ring 44. The ring 44 is frictionally engaged by the sleeve 24 and second shaft segment 46 and thus rotates with the shaft. The flanges 40, 42 insure axial stability of the bearing structure.

The bearing assembly is maintained in place with respect to the fixed support 20 by means of a snap ring 50. The snap ring 50 snaps outwardly after insertion of the ring to engage an annular groove 52 provided in the support 20. Structural support is provided for the sleeve bearing 38 by a bearing block 54 which is provided in two halves for insertion into the channel of bearing 38. The bearing block 54 has an O-ring 56 which engages the inner periphery of the support 20 to seal the bearing structure from the contents of chamber 58 formed by the walls of housing 16. As will be noted, the block 54 has a peripheral flange 60 which engages the groove 52 to hold the block in place.

The opening 62 in the housing 16 is sealed by means of a labyrinth seal provided on the portion 28 of the sleeve 24. Spaced apart annular grooves 64 form teeth 66 which lightly engage a bushing 68 which is press-fitted into the housing opening 62. The teeth 66 form a labyrinth seal, each tooth forming a restriction to the passage of fluid, to thus effectively prevent the ingress or egress of fluid from the housing chamber 58. The bushing 68 is replaceable and may be replaced after wear caused by the rotation of the teeth 66.

Figures 2, 4:
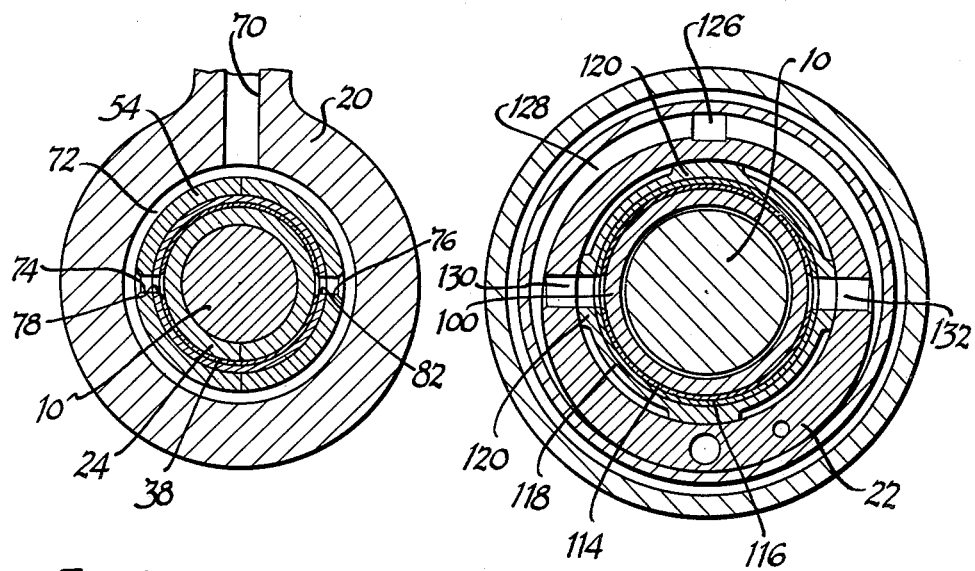
FIGURE 2 is a sectional view taken substantially along the line 2—2 of FIGURE 1 looking in the direction of the arrows and showing the path of the lubricating oil in one of the bearing elements.
FIGURE 4 is a cross sectional view taken substantially along the line 4—4 of FIGURE 1 looking in the direction of the arrows and illustrating the path of the lubricating oil for the second bearing element.

The bearing is lubricated via the sintered sleeve 24. An oil inlet passageway 70 in the housing 16 receives oil under pressure from a central source 71. As best seen in FIGURE 2, oil enters through the passageway 70 and flows around the bearing block 54 through an annular groove 72 formed within said block. A pair of diametrically opposed openings 74, 76 are provided in the block 54. Registering openings 78, 82 are provided in the bearing 38. Lubricating oil passes through these openings into contact with the outer surface of the sintered sleeve 24. As is conventional with a sleeve bearing, oil is forced through the slight clearance between the bearing surfaces to provide the normal amount of lubrication. Additionally, because of the porosity of the sleeve and the pressure of the oil, oil is forced into the sleeve and flows circumferentially therearound to impregnate the sleeve with oil. The centrifugal force exerted as a result of rotation of the sleeve 24 with the shaft 10 throws the oil towards the outer surface of the sleeve. The oil is forced eventually between the bearing surfaces of the sleeves 24, 38, to thus provide a lubricating film between these elements and prevent the film from breaking even if the normal flow is momentarily cut off or is not at a fast enough rate.

The continued fluid pressure exerted on the oil forces the oil towards the enlarged sleeve portion 28 and the ring 44. As a result of the centrifugal force exerted on the oil, it eventually breaks away from the sleeve 24 at 86 and from the ring 44 at its outer periphery 88. Oil also flows, of course, from between the bearing surfaces out of the ends of sleeve 24 and bearing 38. The oil thus dispensed enters chamber 58 and flows by gravity towards an oil outlet passageway 90 provided in the housing 16. The oil flows from passage 90 back to the central oil supply source and is eventually re-circulated through the bearing.

The second shaft segment 46 has a recess 92 in one end and receives the inner end of shaft segment 26. The two shaft segments are secured together by a bolt 94 which extends through an axial opening 96 in the shaft segment 26 into threading engagement with threaded opening 98 provided in the segment 46.

A sintered metal sleeve 100 is provided on the shaft segment 46. This sleeve is similar in construction to the sleeve 24. As will be noted, the portion of the shaft segment 46 within the sleeve 100 has a conical configuration, as does the sleeve. The diameter of the sleeve and the shaft is gradually decreased from 102 towards 104. This configuration locks the sleeve and shaft against axial movement towards the right. The shaft segment has a threaded portion 106 which receives a nut 108 to securely lock the assembly in place. A lock washer 110 is provided on the nut 108 to lock the nut in place.

The sleeve 100 is provided with a bearing surface 112 which is received within metal sleeve bearing 114. The sleeve bearing 114 is press-fitted into a hard metal bushing 116 which in turn is press-fitted into a bushing 118. As will be noted in FIGURE 4, the bushing 118 has a plurality of bosses 120 which contact the interior peripheral surface of the removable support 22. The provision of the bushing 118 with minimal contact with the support 22 and the preferred fabrication of the bushing from sintered metal serves to effectively reduce the heat transfer from the support 22 into the interior of the bearing structure. The porous structure of bushing 118 does not readily absorb heat by convection, and the minimal contact of the bushing with its support considerably reduces the absorption of heat by the bushing by conduction. The support 22 is preferably fabricated from a sintered metal to thus reduce the heat transfer from the exterior bearing environment.

The support 22 is press-fitted into the open end of the housing 16. A peripheral flange 122 is provided on the support 22 to engage the outer end of the housing structure. An O-ring 124 is provided in the outer periphery of the support 22 to seal the interior of the housing 16.

The sleeve 100 is lubricated in much the same manner as the sleeve 24. Referring to FIGURE 4, oil enters the bearing structure through passageway 126 provided in the housing 16. The oil flows around the support 22 up through annular groove 128 provided on the interior periphery of support 22. The oil flows to the sleeve 100 through diametrically opposed registering openings in the bushing and bearing, indicated by the numerals 130, 132. Oil flows between the bearing surfaces and also through the sleeve 100 to lubricate the bearing surfaces and exits into annular groove 134 at one end and into chamber 58 at the other end. The peripheral tooth 136 is provided on the sleeve 100 within the groove 134 to assist in the oil breaking away from the sleeve. The oil subsequently flows by gravity through passageway 138 into the chamber 58 and exits up through the outlet opening 90 to be re-circulated. The exit passageway 138 is provided in the support 22. This passageway is drilled via opening 140 which is subsequently closed by a plug 142. The sleeve 100 is provided with a plurality of grooves 144 forming teeth 146 which engage an annular bushing 148 to form a labyrinth seal as previously described in connection with the bearing 12. This seal prevents the egress of oil from the bearing structure and the ingress of hot gases into the bearing structure. In order to further prevent the ingress of hot gases into the bearing structure, an air pressure is maintained at the seal formed by the teeth 146. This pressure is higher than the pressure of the hot gases to thus provide a continuous leakage of air outwardly from the bearing rather than of hot gases into the bearing. Air pressure is provided from a source (not shown) through passageways 150, 152 (sealed by plug 154), passageway 156 and opening 158 in the bushing 148.

The bearing structure 14 is completed by a sintered metal ring 162 which is mounted adjacent the outer end thereof. The ring 162 acts as a heat insulator to shield the bearing structure from hot gases developed in the gas turbine. The structure is retained in place by a snap ring 164 which is received in an annular groove 166 provided in the structure 160.

There are several advantages inherent in the bearing construction thus described. The use of sintered material to form the sleeves attached to the shaft results in preventing the heat of the turbine shaft (which in operation is at an elevated temperature) from harming the bearing surface. This results not only because of the porous nature of the sleeve but also because the oil embedded in the sleeve will itself absorb a considerable quantity of heat. The combined action of the sleeve porosity and heat absorption of the embedded, circulating oil, efficiently damp the heat flow from the shaft through the sleeve. This tends to prevent wear on the bearing surfaces.

The rotating, porous sleeve also assures oiliness of the bearing running surfaces to thereby maintain an uninterrupted oil film on the running surfaces. This film is provided not only at the start, but also during sudden variations of shaft speeds and loads. This design configuration provides proper lubrication and also allows a wide choice of lubricating oils for the bearing.

Having thus described my invention, I claim:

1. A rotatable bearing structure comprising a first rotatable sleeve fabricated of an oil-permeable material; said first sleeve having an outer bearing surface; a second sleeve having an interior bearing surface surrounding the bearing surface of the first sleeve and in sliding contact therewith; means to apply lubricating oil under pressure to the outer surface of said first sleeve; said first sleeve having a portion extending outside of the second sleeve; liquid trap means to receive oil flowing from said first sleeve; whereby in operation of the bearing, oil will flow along the outer surface of the first sleeve and through the oil-permeable material of the first sleeve and be distributed between said bearing surfaces to form a lubricating film, and subsequently flow through the portion of the first sleeve outside of the second sleeve and be thrown therefrom by centrifugal force and captured by the trap means.

2. A rotatable bearing comprising a first sleeve fixed to a rotatable shaft; said first sleeve being fabricated of a porous material capable of accommodating the flow of lubricating oil therethrough; said first sleeve having an outer bearing surface; a second fixed sleeve having an interior bearing surface surrounding the bearing surface of the first sleeve and in facial contact therewith; said second sleeve having opening means therethrough located substantially at the longitudinal center thereof; a lubricating oil conduit in liquid communication with the opening means of said second sleeve and connected to a source of lubricating oil under pressure to apply lubricating oil under pressure to the other surface of said first sleeve; oil under pressure being applied to the first sleeve during operation of the bearing and flowing on the surface and through the porous material of the first sleeve for distribution by centrifugal force between said bearing surfaces to form a lubricating film.

3. A rotatable bearing for supporting concentric radially spaced elements for relative rotation; one of the elements being at an elevated temperature, comprising an annular porous oil-permeable sleeve of appreciable axial extent interposed between said surfaces and fixed to the one element for rotation therewith; the other of said elements having opening means therethrough for supplying liquid lubricant under pressure to the sleeve for flow therethrough to the annular bearing interface defined between the other of the elements and the sleeve; the oil-permeable sleeve by virtue of its porosity thermally insulating the bearing interface from the one element and by virtue of its oil permeability accommodating the flow of oil along the entire axial extent of the sleeve to lubricate the entire bearing interface.

4. A rotatable bearing for operation in an environment at a relatively high ambient temperature; said bearing having supported concentric radially spaced elements for relative rotation, one of the elements being at an elevated temperature, an annular porous oil-permeable sleeve of appreciable axial extent interposed between said elements and fixed to the one element for rotation therewith, means for supplying liquid lubricant under pressure to the sleeve for flow therethrough to the annular bearing interface defined between the other of the elements and the sleeve, the oil-permeable sleeve by virtue of its porosity thermally insulating the bearing interface from the one element and by virtue of its oil permeability accommodating the flow of oil along the entire axial extent of the sleeve to lubricate the entire bearing interface, and a shell of porous material substantially surrounding the bearing to thermally insulate the bearing from the ambient temperature.

5. A bearing structure comprising a first sleeve fixed to a rotatable shaft; said first sleeve being fabricated of a porous material having thermal insulating qualities and being capable of accommodating the flow of oil therethrough; said first sleeve having an outer bearing surface; the second sleeve having an interior bearing surface surrounding the bearing surface of the first sleeve and in facial contact therewith; an annular support member surrounding and supporting the second sleeve; an annular interior passageway in the annular support member; said second sleeve having a plurality of openings therethrough in fluid communication with said annular passageway; and means to supply lubricating oil under pressure to said annular passageway whereby to apply oil under pressure to the outer surface of said first sleeve through the openings in the second sleeve to provide for the flow of oil through the porous material of the first sleeve for distribution between said bearing surfaces to form a lubricating film.

6. A bearing structure comprising a fixed annular support element; an annular support bushing mounted in said fixed support element; said bushing having a plurality of spaced-apart exterior peripheral bosses contacting said fixed support element thus minimizing heat transfer between said members; a rotatable shaft having a first sleeve fixed thereto positioned within said bushing and spaced therefrom; said first sleeve being fabricated of a porous material capable of accommodating the flow of oil therethrough and having thermal insulating qualities; said first sleeve having an outer bearing surface; a second sleeve interposed between the bushing and the first sleeve and having an interior bearing surface surrounding the bearing surface of the first sleeve and being fixed to the bushing; and means to apply lubricating oil under pressure through the bushing and second sleeve to the outer surface of said first sleeve to accommodate oil flow through the porous material of the first sleeve for distribution between said bearing surfaces to form a lubricating film.

7. A bearing structure comprising a housing having an opening therein; a fixed annular support element in the housing; a rotatable shaft extending through the housing opening and fixed support element; a first sleeve fixed to the shaft and having a first portion with an exterior bearing surface positioned within said bushing; said sleeve having a second portion extending into the housing opening; a plurality of spaced apart annular teeth on said second portion in contact with the housing wall portions forming said opening to form a labyrinth fluid seal; said first sleeve being fabricated of a porous material capable of accommodating the flow of oil therethrough and having thermal insulating qualities; a second sleeve having an interior bearing surface surrounding the bearing surface of the first sleeve and being fixed to the fixed annular support member; and means to apply lubricating oil under pressure through the fixed annular support member and second sleeve to the outer surface of said first sleeve to accommodate oil flow through the porous material of the first sleeve for distribution between said bearing surfaces to form a lubricating film.

References Cited in the file of this patent

UNITED STATES PATENTS

| | | |
|---|---|---|
| 2,223,518 | Heuberger | Dec. 3, 1940 |
| 2,349,203 | Spencer | May 16, 1944 |
| 2,573,597 | Paden | Oct. 30, 1951 |